United States Patent [19]

Maruyama

[11] Patent Number: 6,052,763
[45] Date of Patent: Apr. 18, 2000

[54] MULTIPROCESSOR SYSTEM MEMORY UNIT WITH SPLIT BUS AND METHOD FOR CONTROLLING ACCESS TO THE MEMORY UNIT

[75] Inventor: Teruyuki Maruyama, Yokosuka, Japan

[73] Assignee: Ricoh Company, Ltd., Tokyo, Japan

[21] Appl. No.: 08/992,097

[22] Filed: Dec. 17, 1997

[30] Foreign Application Priority Data

Dec. 17, 1996 [JP] Japan .................................. 8-336638

[51] Int. Cl.[7] .................................................. G06F 12/14
[52] U.S. Cl. .............................. 711/152; 711/163; 711/1
[58] Field of Search .................................. 711/152, 163, 711/1

[56] References Cited

U.S. PATENT DOCUMENTS

| | | | |
|---|---|---|---|
| 5,485,594 | 1/1996 | Foster ....................................... | 711/100 |
| 5,499,356 | 3/1996 | Eckert et al. ............................. | 711/152 |
| 5,860,126 | 1/1999 | Mittal ...................................... | 711/167 |
| 5,889,983 | 3/1999 | Mittal et al. ............................. | 712/223 |

OTHER PUBLICATIONS

Patent Abstracts of Japan; Physics; Section No. 1217; vol. 15; No. 242; p. 20; 3–074759; Jun. 21 1991.

*Primary Examiner*—David L. Robertson
*Attorney, Agent, or Firm*—Oblon, Spivak, McClelland, Maier & Neustadt, P.C.

[57] ABSTRACT

A memory unit and method for using the memory unit in a tightly coupled multiprocessor system having a split model bus is configured to perform an atomic transaction that is carried out in a synchronous mode on the basis of semaphore variables or lock variables. A decoder is included in the memory unit and generates an atomic address space and a conventional address space in an address space of a RAM portion of the memory unit. An identifier unit identifies whether a memory access request is from a bus master and is for an atomic address space or for the conventional and address space. Based on whether the access request is for the atomic address space or the conventional address space controls an atomic transaction mode-shifting unit to shift between an atomic transaction mode of operation and a normal mode of operation.

26 Claims, 8 Drawing Sheets

ADDRESS
0

CONVENTIONAL ADDRESS
RANGE m — — — — — — — — — — — —

ATOMIC ADDRESS RANGE

MULTIPROCESSOR SYSTEM MEMORY UNIT WITH SPLIT BUS AND METHOD FOR CONTROLLING ACCESS TO THE MEMORY UNIT

BACKGROUND OF THE INVENTION

1. Field of the Invention

The present invention relates to memory units used in multiprocessor systems and methods for using memory units in multiprocessor systems. More particularly, the present invention is directed to a method and apparatus associated with a memory unit connected to a tightly coupled multiprocessor system that includes a split model bus and executes atomic transactions in a synchronous mode using semaphore variables or lock variables.

2. Description of the Related Art

Recently, multiprocessor systems have become more popular and employ plural processors connected in a way that allows the multiprocessor system to offer greater processing capability than systems employing a single processor. Such multiprocessor systems employ a few processors and distribute the processing demands on the respective processors by assigning plural functions to the processors and later combining the results. In order to capitalize on the benefits of this parallel processing approach, the processors must be able to communicate with one another effectively and share resources effectively. To this end, conventional multiprocessor systems employ two alternative system architectures named tightly coupled multiprocessor systems and loosely coupled multiprocessor systems.

FIG. 1 shows an example of a block diagram showing the loosely coupled multiprocessor system. Plural processors 2a, 2b . . . are directly connected to respective dedicated local memories 1a, 1b . . . The plural processors 2a, 2b . . . are interconnected by a system bus 3 in this loosely coupled multiprocessor system.

FIG. 2 shows an example of a block diagram showing the tightly coupled multiprocessor system. Plural processors 4a, 4b . . . and a shared memory 6 are connected by a system bus 5. Certain efficiencies, such as a lower number of memories, exist in the tightly coupled multiprocessor system that are not present in the loosely coupled multiprocessor system of FIG. 1. However, memory contention problems exist in the tightly coupled multiprocessor system that are not present in the loosely coupled multiprocessor system. The memory contention problems result from the plural processors 4a, 4b . . . accessing and changing a common block of memory in the shared memory 6. This so called access contention occurs because each of the plural processors 4a, 4b . . . has independent access to the shared memory 6. Therefore, arbitration is needed in the tightly coupled multiprocessor system so as to avoid the situation where one of the processors accesses a memory block at the same time as another processor, and then both processors attempt to change the contents of the same memory block.

In access arbitration, control operations or control signals between the processors 4a, 4b . . . synchronize the tightly coupled multiprocessor system. This arbitration employs semaphore variables (or lock variables) stored in the shared memory 6 to control which of the processors 4a, 4b, . . . have control over accessing and changing a predetermined portion of the shared memory 6. Conventional semaphore variables P(s), V(s) are functions of non-negative integer "s", where a semaphore operation is carried out in the basis of following expressions:

If P(s) is s>=1 then s=s−1, and go to next operation,
If v(s) is s=0 then s>=1, and then wait.

When lock variables are used, the lock variables function as flags that define whether a processor has permission to access the memory 6 as determined by a test-and-set operation.

Further explaining the risk of memory contention, unless some convention is set between the respective processors for honoring a globally recognized state of the shared memory 6, a block of memory that is currently accessed by a first processor may be rewritten during a memory access operation by a second processor, thus rendering the original information extracted by the first processor useless, because it would be unclear as to what is the globally recognized state of the memory (i.e., that extracted, and perhaps changed by the first processor or the new contents inserted by the second processor). Therefore, the semaphore variables or lock variables are stored in the shared memory 6 as a convention for determining which of the processors are authorized to change the state of the memory.

Using the semaphore or lock variable, when a processor tries to rewrite a memory block, the processor recognizes whether lock variables or semaphore variables may be rewritten or not by accessing the semaphore variables or lock variables. When the bytes may not be rewritten, the processor rewrites the semaphore variables or lock variables and performs a rewrite operation. As a result, a synchronization of when the semaphore variables or lock variables are recognized and rewritten must be performed.

A series of processor steps between a recognition event and a rewrite event are inseparable and are called atomic transaction. Moreover, the atomic transaction ensures that a series of operations may be completed as a group, but if not, perhaps as a result of being interrupted mid-stream, the series of operations are discontinued and the state of the memory is returned to the original state before the atomic transaction was initiated. In this way the atomic transaction may be viewed as an "all or nothing" operation that preserves the state of the memory if all of the operations cannot be completed.

However, when one of the processors accesses and rewrites the semaphore variables or the lock variables while another processor is executing a series of recognition and rewrite operations for same variable, the operations become confused for lack of proper synchronization with respect to changing the semaphore or lock variables. Korth, H., F., et al., Database System Concepts, second edition, McGraw-Hill Inc., pp. 313–423, 1991, provides a general discussion on recovery and atomicity, the entire contents of this reference being incorporated herein by reference. Myers, B., et al., Mastering Windows NT Programming, Sybex Inc., 1993 provides a general discussion on semaphore variables, the entire contents of this reference being incorporated herein by reference.

One conventional solution to solving the problem of access synchronization, attempts to not separate the recognizing operation from the rewriting operation and prohibits the other processors from executing additional operations during the recognition and rewriting operations. Japanese patent application 64-210037 discloses such a non-separated operation between recognition and rewrite for lock variables in the atomic transaction. Moreover, when a processor operates the recognition and rewrite for the shared memory 6, a bus that interconnects the respective processors is locked and accesses from the other processors for the shared memory are prohibited. In Japanese patent application 64-210037 it is explained that until the atomic transaction is complete, the bus is locked so as to prohibit another processor from accessing the bus.

As shown FIG. 3, a conventional multiprocessor system uses a split model bus that includes low performance bus 13 and a a high performance bus 11 for interconnecting processors 9a, 9b . . . and other high speed devices such as the shared memory 10 and the hard disk apparatus 14 that includes a hard disk 7 and a hard disk controller 8, as shown. The low speed bus 13 connects to the system bus 11 by way of a bus adapter 12. The low speed bus 13 is used to allow plural input-output devices and peripherals to have access to the system. The split model bus system can separately and simultaneously communicate address data and another data on the respective buses.

However, as recognized by the present inventor, the atomic transaction as discussed in the above described Japanese patent application 64-210037 impairs the ability to separately and simultaneously communicate in the split model bus system until the atomic transaction is complete.

SUMMARY OF THE INVENTION

One object of the present invention is to overcome the above identified problems encountered in the aforementioned prior art as well as other conventional devices.

This and other objects of the present invention are achieved with a memory unit that accommodates atomic transaction synchronization using semaphore variables or lock variables, connected in a tightly coupled multiprocessor system using a split model bus. The memory includes the following: a decoder that generates an atomic address space that mirrors a conventional address space; an identifier unit that identifies whether memory access requests from a bus master via a bus is for the atomic address space or for the conventional address space; an atomic transaction mode shifting unit that shifts the memory into the atomic transaction mode when the identified memory access request is a request for the address space, the identified memory access request being recognized as an atomic transaction start request when the memory is operated in a normal mode; a register that holds a bus master identifier for the device that initiated the atomic transaction start request; a normal mode shifting unit that shifts the memory to a normal mode when an identifier of a memory access requesting device agrees with the identifier held in the register, such that the memory access request is recognized as an atomic transaction quit request in the atomic transaction mode; a prohibit unit that requests a re-try for a memory access request and prohibits a memory access request when the bus master identifier that requests the memory access request disagrees with the identifier held in the register.

According to a second aspect of the present invention, the inventive memory includes a discrimination mechanism that determines whether the bus master is a processor or not, and when the bus master is not a processor, the discrimination mechanism permits a memory access request.

According to a third aspect of the present invention the inventive memory prohibits a memory access in the case of a memory access request to an atomic address space.

According to a forth aspect of the present invention, the register in the inventive memory holds an address on the conventional address space corresponding with an access address of the atomic transaction start access request, the prohibit unit prohibits a memory access in the case that the memory access is a request to the conventional address space corresponding with the atomic transaction start access request.

According to a fifth aspect of the present invention, the memory includes a timer that determines when a prescribed time elapses between an atomic transaction start request and an atomic transaction quit request. The memory also includes a terminate unit that forcefully terminates an atomic transaction mode after the prescribed elapsed time.

According to a sixth aspect of the present invention, a memory unit that accommodates atomic transaction synchronization using semaphore variables or lock variables, connected in a tightly coupled multiprocessor system using a split model bus. The memory includes the following: a decoder that generates an atomic address space that mirrors a conventional address space; an identifier unit that identifies whether memory access requests from a bus master via a bus is for the virtual address space or for the real address space and discriminating between a memory read access to the atomic address space and a read-modify-write access request; a data replying unit that returns reading data to a bus master in conjunction with a conventional address corresponding to an access address of a memory read access request identified with a read-modify-write access request and writes a number corresponding to a false data in the atomic address space.

BRIEF DESCRIPTION OF THE DRAWINGS

These and other objects and further features of the present invention will become readily apparent from the following detailed description when read in conjunction with the accompanying drawings, wherein:

FIG. 5 is a conceptual diagram of a conventional address space and an atomic address space of the memory of FIG. 4;

DESCRIPTION OF THE PREFERRED EMBODIMENT

Figure 1:
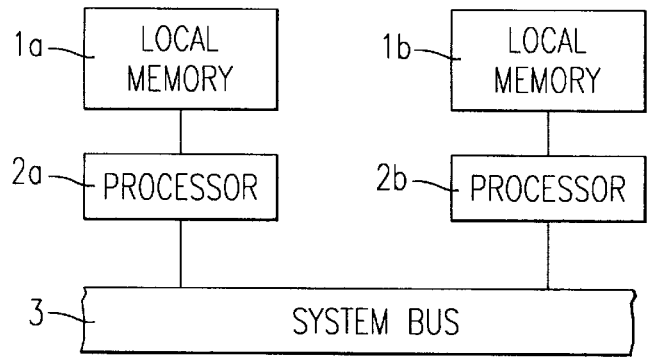
FIG. 1 is an example of a block diagram showing a conventional loosely coupled multiprocessor system.
Figure 2:
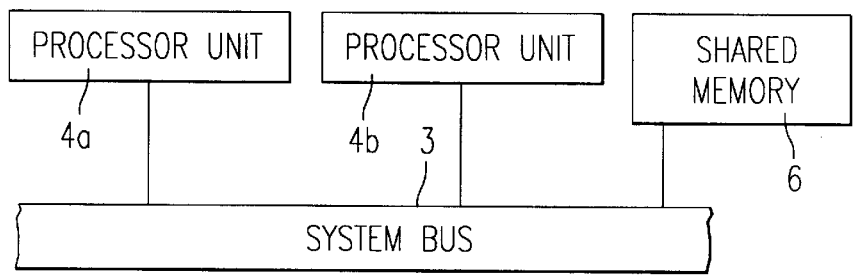
FIG. 2 is an example of a block diagram showing a conventional tightly coupled multiprocessor system.
Figure 3:
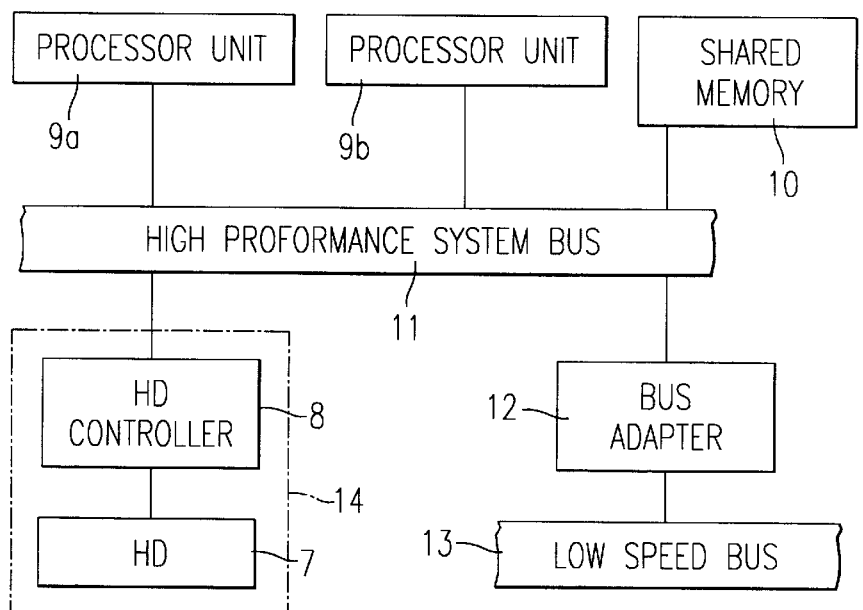
FIG. 3 is an example of a block diagram showing a conventional split model bus system.
Figure 4:
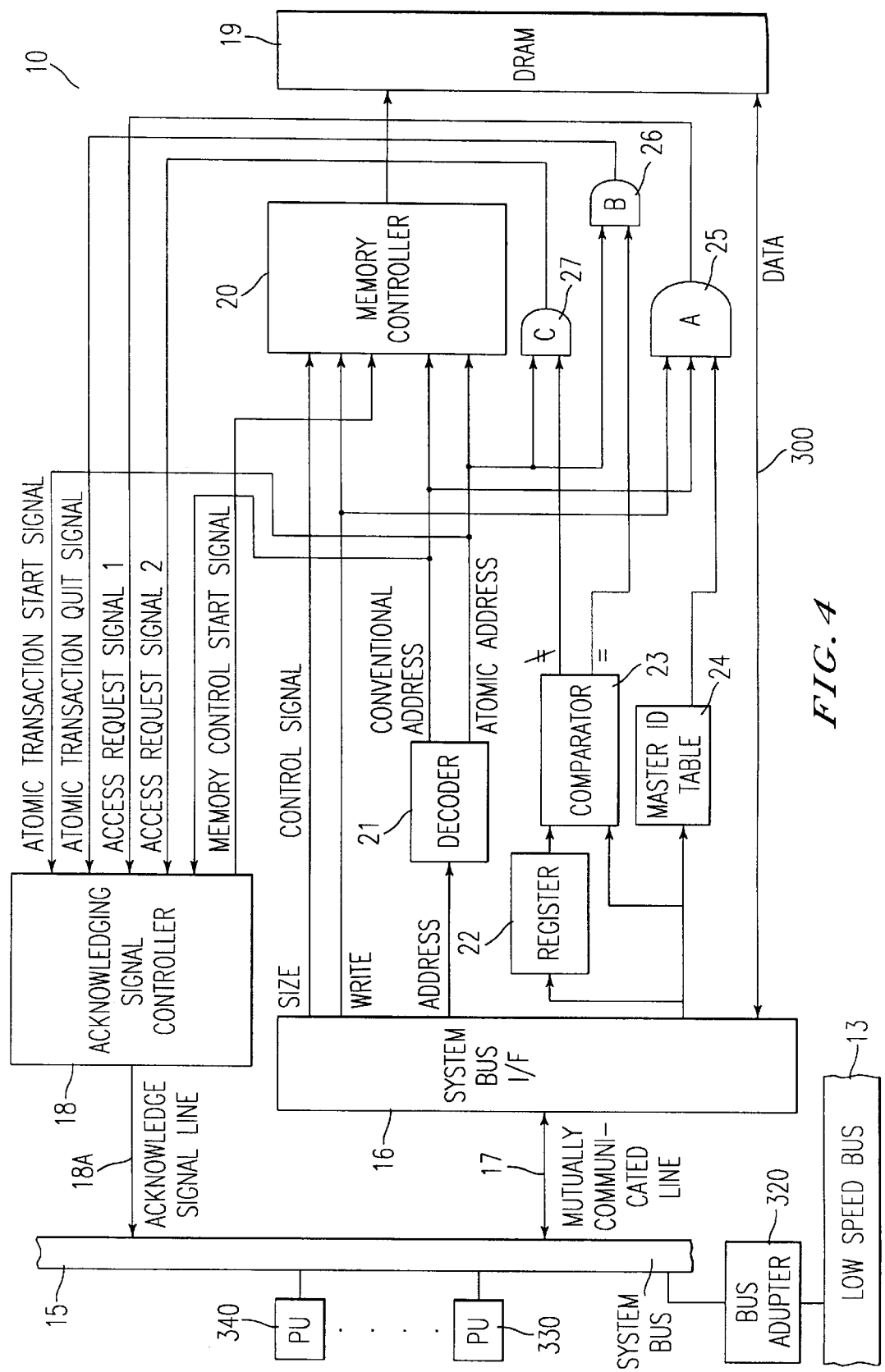
FIG. 4 is a block diagram of a multiprocessor system according to first embodiment of the present invention.

Referring now to the drawings, wherein like reference numerals designate identical or corresponding parts throughout the several views, FIG. 4 is a block diagram according to a first embodiment of the present invention. FIG. 4 shows a tightly coupled multiprocessor based system that uses a split model bus. Specifically, a system bus 15 connects to a low speed bus 13 by way of a bus adapter 320. The system bus also connects to at least one processor 330 and another device (perhaps a second processor, 340) that access the dynamic random access memory 19 (DRAM, or other type of addressable memory such as SRAM, ROM, EPROM, etc.) as will be discussed.

The system bus 15 connects to the memory unit 10 (which includes all of the components in FIG. 4, except for the system bus 15, bus adapter 320, processors 330, 340 and low speed bus 13) by way of a mutually communicated line 17 and an acknowledge signal line 18A. The lines 17 and 18A may also be multiconductor buses, direct wire(s), or multipin connector(s). A system bus interface unit 16 connects to the system bus 15 with the mutually communicated line 17, that operates bidirectionally. The system bus 15 also connects to an acknowledging signal controller 18 that communicates acknowledge signals to the system bus 15 in one direction, as will be discussed.

The system bus interface unit 16 receives memory access requests from the system bus 15, and sends access data to the DRAM 19 by way of control signals from a memory controller 20. The access addresses are address information that designate the access range of the DRAM 19. In other words, the memory controller 20 receives control signals and access addresses from the system bus interface unit 16 and generates memory control signals on the basis of the information and then sends the memory control signals to the DRAM 19. At this time, access addresses from the system bus interface unit 16 are stored in the decoder 21 while an identification of the bus master (a device that has control over communication on the bus 15 and/or access control over the memory unit 10) is sent to, and stored in, a register 22. Connected to the register 22 is a comparator 23 that cooperates with a master ID table 24 (hosted in a EPROM or battery back-up RAM, for example) that holds addresses of different candidate processors and other devices that may access the DRAM 19. Data, such as image data from a scanned image, is transmitted directly to the DRAM 19 by way of the data bus 3000, as shown in FIG. 4.

In the present invention, and as shown FIG. 5, a memory address space in the DRAM 19 covers both an atomic address space and a conventional address space. The atomic address space is an address range and is not necessarily a physical address of the DRAM 19 (although it could be depending on how the physical address space in the DRAM 19 is partitioned) but is a designation employed in the present invention to refer to a mirror image of the conventional address space (e.g., the complete set of physical addresses) and is used to reflect data held in the real address portion of memory during an atomic transaction. For example, in a first circuit arrangement, the contents of a block of real memory is copied to a memory in a processor. The contents of the block of memory copied to the processor will change during an atomic transaction. Once the atomic transaction is complete, the processor will overwrite the values stored in the real (i.e., physical) memory with the changed values hosted in the processor's memory. In a second circuit arrangement, the contents of a memory block are not copied. Rather, a lock variable is set in an address space of the respective memory locations in the DRAM 19, indicating that other processors may not access the memory locations that are locked during the atomic transaction. In this second circuit arrangement, when the atomic transaction is complete, the lock variable is changed in the address space, indicating to other processors (or other devices) that the memory block is now accessible.

As seen in FIG. 5, the atomic address space does not overlap with the conventional address space. To realize the atomic address space, for example, a flag bit corresponding to an address in the atomic address space is added to a set of bits used to designate the address in the conventional address space. In other words if an 8-bit address is required to address all of the spaces in the conventional address space, then a ninth address bit is added. The atomic address space is an address space in order to implement the atomic transaction.

The decoder 21 (FIG. 4) indentifies whether an access address, as received from a processor by way of the system bus 15 and the interface 16, is for the conventional address space or for the atomic address space by the above described flag, and sends the memory controller 20 the distinguished address and with the decoder serves as an atomic transaction identifier unit. Accessing the atomic address space, rather than the conventional address space, serves as an indication that a processor is requesting the initiation of an atomic transaction. To this end, the decoder 21 outputs decode signals corresponding to whether a conventional address is being accessed or an atomic address is being accessed and thus serves as an atomic transaction mode shifting unit. The memory controller 20 then designates an access address in the DRAM 19 according to the requested address, distinguishing whether an access address is for a conventional address space or for an atomic address space by the above described flag.

The register 22, comparator 23 and bus master ID table 24 cooperate (as an identifier unit) to determine if a requesting processor is a bus master with privileges for performing an atomic transaction. The register 22 temporally holds a bus master ID (i.e., identifying a last bus master having memory access rights) provided from the system bus interface unit 16. The comparator 23 compares the master ID from the system bus interface unit 16 with the bus master ID held in the register 22. As shown, the comparator 23 outputs one signal if the present processor's ID is not the same as the bus master, and outputs a second signal if the present processor's ID is the same as that of the bus master.

The system bus interface unit 16 inputs various data from the system bus 15, and (1) transmits control signals (such as block size and write signals) to the memory controller 20, (2) provides access address to the decoder 21, (3) provides a bus master ID to the register 22, the comparator 23 and the master ID table 24, and (4) provides data directly to/from the DRAM 19. The master ID table 24, implemented with a coincidence circuit and lookup table of processor ID's, distinguishes whether a bus master is a processor on the basis of comparing the bus master ID from the system bus interface unit 16 with the entries in the lookup table and outputting a signal indicative of whether or not there is a match. The output signal is provided to the AND gate A 25.

The decoder 21 outputs a signal indicative of the requested address being in the conventional address space and another signal indicative of the requested address being in the atomic address space, where the respective states of the signals depends on the requested address space as provided by the system bus interface unit 16. The conventional address signal is provided to the AND gate A 25, the memory controller 20, and the acknowledging signal controller 18, as shown. The atomic address signal is provided to the memory controller 20, the acknowledging signal controller 18, and the AND gates C and B.

During a normal mode of operation, the output of the AND gate A serves as an access request signal 1, which triggers the acknowledging signal controller 18 to send an acknowledge signal to the requesting device. However during an atomic transaction mode of operation, the output of the AND gate A 25 serves as a "retry" signal, which is formatted by the acknowledging signal controller and sent to the requesting device. In this later case, the retry is needed to inform the requesting device that the memory is occupied with an atomic transaction, and the requesting device should try again later. To this end, the AND gate A 25 performs a logical AND operation on an output from the master ID table 24, the conventional address space signal from the decoder 21 and the write control line from the interface 16 (all of which jointly serve as a memory access prohibit unit). The AND gate A 25 outputs a logical conjunction of the above signals, access request signal 1, to the acknowledging signal controller 18.

Shifting from a normal mode of operation to an atomic transaction mode is initiated by a processor that accesses the atomic address space by way of the decoder 21 and the memory controller 20 (which jointly serves a normal mode shifting unit, the decoder serving as a discrimination mechanism). Thus, as shown, the atomic address signal output from the decoder 21 to the acknowledging signal controller 18 is viewed by the acknowledging signal controller 18 as an atomic transaction start signal.

Once in the atomic transaction mode, an ID of the bus master that makes the atomic transaction request is temporally stored in the register 22. Subsequently, for future requests, the comparator 23 compares the temporally stored bus master ID with the ID of the requesting device and provides a "not equal" signal to the AND gate C 27 if not equal, but provides an "equal" signal to the AND gate B 26, if equal.

The AND gate B 26 logically ANDs the "equal" signal from the comparator 23 with the virtual address signal from the decoder 21, and the output of the AND gate B 26 being indicative of the bus master terminating the atomic transaction in the form of an atomic transaction quit signal provided to the acknowledging signal controller 18, as shown (and jointly serving as an atomic transfer termination unit). Accordingly, the bus master that was performing the atomic transaction concludes the atomic transaction by making another memory address request in the atomic address space.

The AND gate C receives inputs from the "not equal" signal from the comparator 23 and the atomic address signal from the decoder 21 and, when both conditions are met, outputs an access request signal 2, signifying that a requesting device other than the bus master that is currently performing an atomic transaction made an access request. This signal is provided by the AND gate C 27 to the acknowledging signal controller 18, which serves as an indication that the requested transaction is prohibited, so that the acknowledging signal controller 18 can inform the requesting device to retry at a later time.

Figure 6:
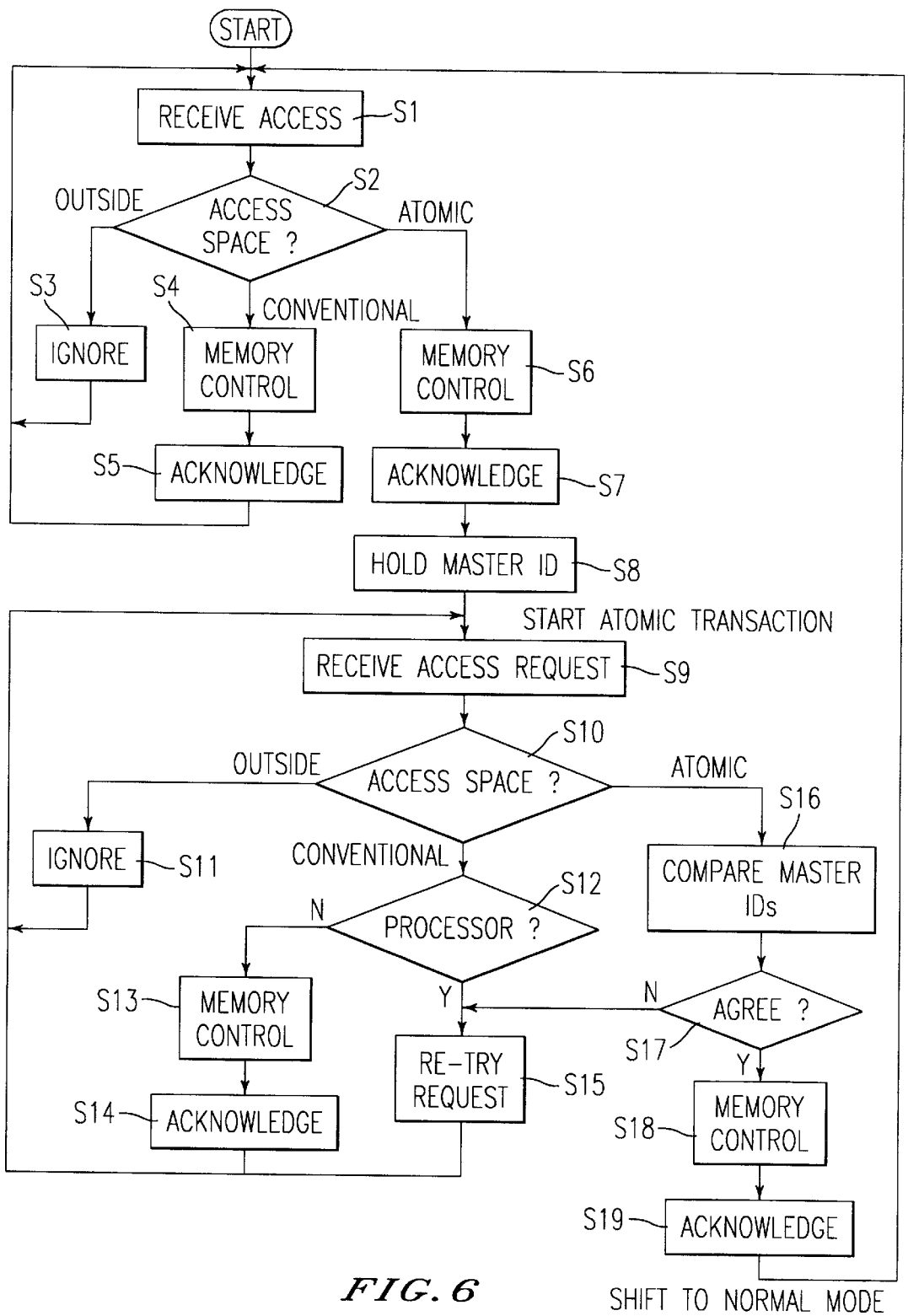
FIG. 6 is a flow chart of a process flow of the memory usage method according to the first embodiment of the present invention.

Now referring to FIG. 6, a flow chart is presented that illustrates the respective steps of a process employed as part of the first embodiment of the present invention. At a step S1, a bus master makes a memory access request of the memory unit 10. In reply, the system bus interface unit 16 in the memory unit 10 receives the access address via the system bus 15. The process proceeds to step S2 where an inquiry is made in the decoder 21 about whether the requested access is outside the memory space, in the real portion of the memory space, or in the virtual portion of the address space. The kind of memory space is determined by the memory controller 20 based on the output of the decoder 21. Specifically, higher bits of the address decoded by the decoder 21 identify whether the bus master accesses the atomic address space or the conventional address space, or neither. The process proceeds to step S3 when the access space is neither the atomic address space nor the conventional address space, for example, an address space of other devices. In step S3 the memory access request is ignored, and the process returns to step S1. If the response to the inquiry in step S2 indicates the conventional address space is being accessed, the process proceeds to step S4. Step S4 includes sending a control signal, identified as "memory control start signal," from the signal controller 18 to the memory controller 20 so as to enable or disable the memory controller 20 for subsequent access requests. In step S4, the decoder 21 outputs an access address of the conventional address space and the memory controller 20 outputs a memory control signal and controls the DRAM 19 in a step S4. Then, in step S5, AND gate A 25 transmits to the acknowledging signal controller 18 the access request signal 1, which signifies to the acknowledging signal controller 18 that an acknowledge signal should be returned to requesting device.

If the response in step S2 indicates the access address space is the atomic address space, the process proceeds to steps 6 and 7, which perform actions of memory control and acknowledge steps likes those of steps 4 and 5. Then, in step S8, the register 22 holds the master ID that was transmitted from the system bus interface unit 16 and an atomic transaction begins, as indicated by the atomic transaction start signal being transmitted from the decoder. Here, a memory access signal from the bus master means that an atomic transaction needed for synchronous operation of plural processors is carried out. Steps S9 and S10 cooperate to judge whether the requested address space is the conventional address space or the atomic address space or a memory space of the other device, similar to steps S3, S4 and S6 respectively. However, if the response to the inquiry in step S10 indicates the request is out of range, the process returns to step S9. When the access address space is the conventional address space, the process proceeds to step S12 where an inquiry is made regarding whether the requesting bus master is a processor. If the response to the inquiry is negative, the process proceeds to steps S13 and S14 where the memory controller 20 controls the DRAM 19 and the acknowledging signal controller 18 returns an acknowledge signal that acknowledges completion of the memory control in the conventional address space to the system bus 15 and the process returns to step S9.

On the other hand, when the inquiry in step S12 determines that a processor made the request, the acknowledging signal controller 18 sends a re-try request through the system bus 15 in a step S15 and the process returns to step S9. When the acknowledging signal controller 18 only receives an access request signal 1 from the AND gate A 25, the bus master is a processor because the AND gate A 25 outputs an access request signal 1 only when a processor requests a memory access. So, when the acknowledging signal controller 18 does not receive an access request signal 1 from the AND gate A 25, the bus master is not a processor.

If the inquiry in step S10 determines that the requested address space is atomic address space, the process flows to step S16. In step S16, the AND gate B 26 identifies whether a bus master that requests memory access to the atomic address space is the same as a bus master that carries out an atomic transaction start access request. More particularly, the comparator 23 compares a master ID of a bus master that operates the atomic transaction stored the register 22 with a master ID which requests for a memory access to the atomic address space in a step S16. The comparative result on the comparator 23 is sent to the acknowledging signal controller 18 via the AND gate B 26 and the AND gate C 27. And then in step S17, the acknowledging signal controller 18 judges whether the bus master IDs agree or not. When the master IDs agree, the process proceeds to steps S18 and S19 where the memory control and acknowledge operations are performed and then the mode of operation shifts to a normal mode. However, when the master IDs do not agree in step S17, the process proceeds to step S15 the AND gate C 27 sends an access request signal 2 the acknowledging signal controller 18.

In the case that it was judged that the bus master IDs are not the same with the step S17, the acknowledging signal controller 18 carries out a re-try replying process in step S15 according to the access request signal from the AND gate C 27. In the case that it was judged that the bus master IDs agrees with the step S17, the memory controller 20 carries out a memory control in a step S18. Subsequently, the acknowledging signal controller 18 transmits an acknowledge signal corresponding to the memory control to the system bus 15 in a step S19.

As discussed above, as for the memory unit 10 of the first embodiment of the invention, processors and devices that request access to the memory unit 10 other than the processor that requested an initial atomic transaction start access, are refused to access the memory unit during the atomic transaction mode with the exception of bus masters, as discussed below, which have limited access.

Thus, the atomic transaction of the processor is carried out correctly, without being disturbed by accesses from other processors. In this case, the split buses of the tightly coupled multiprocessor system are not locked and other processors and devices can use the buses. Therefore, the advantage of the split model bus is not compromised during atomic transactions.

Furthermore, a memory access of a bus master, when the bus master is other than a processor, is limited to read access only. However if the bus master is a processor that implements the atomic transfer, read and write access is permitted. Accordingly, a memory read access of a bus master, other than the processor that operates the atomic transaction, becomes possible during the atomic transaction mode. Therefore, the memory unit 10 can be efficiently used in the present invention.

Figure 7:
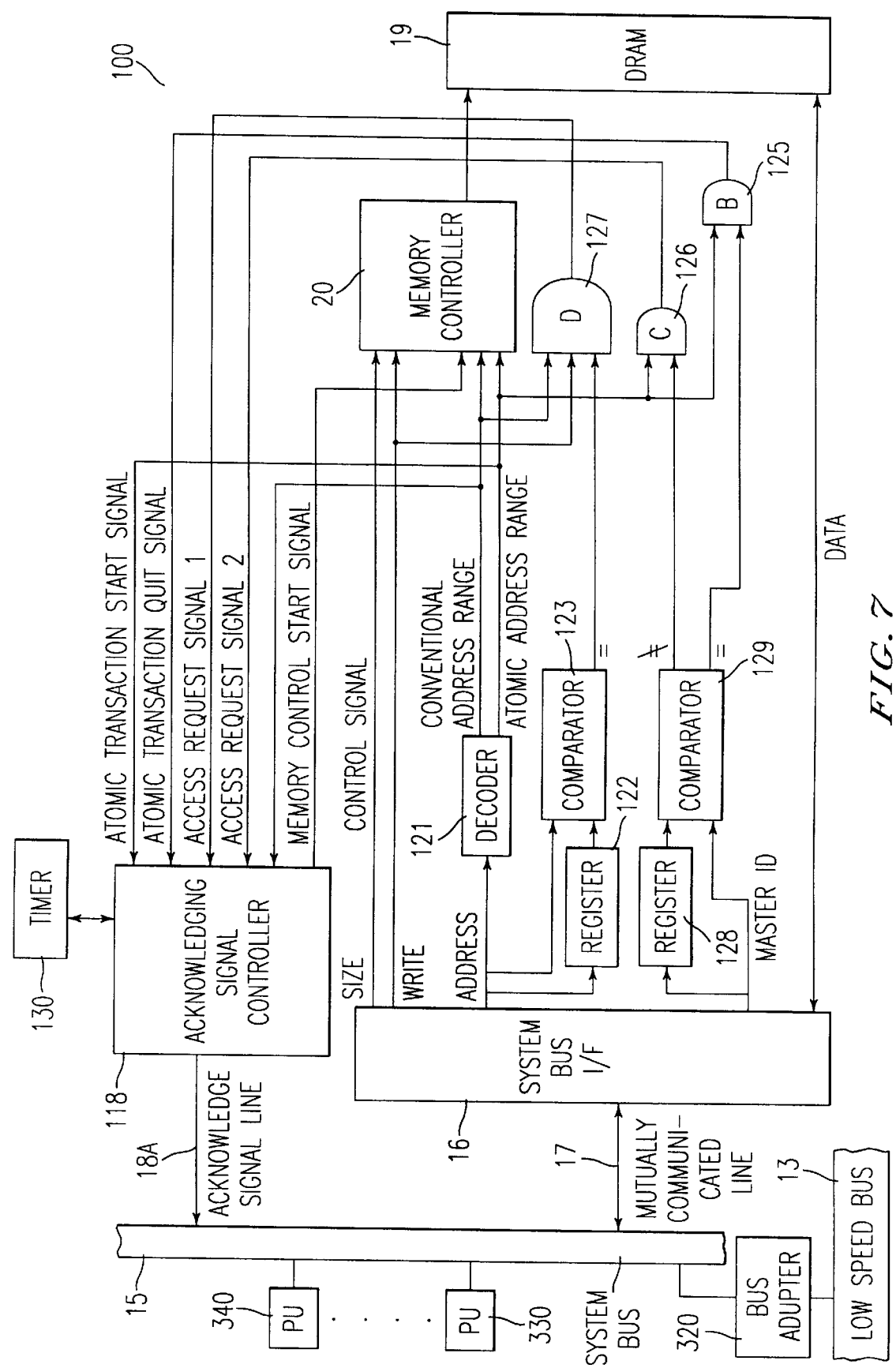
FIG. 7 is a block diagram of a multiprocessor system according to second embodiment of the present invention.
Figure 8:
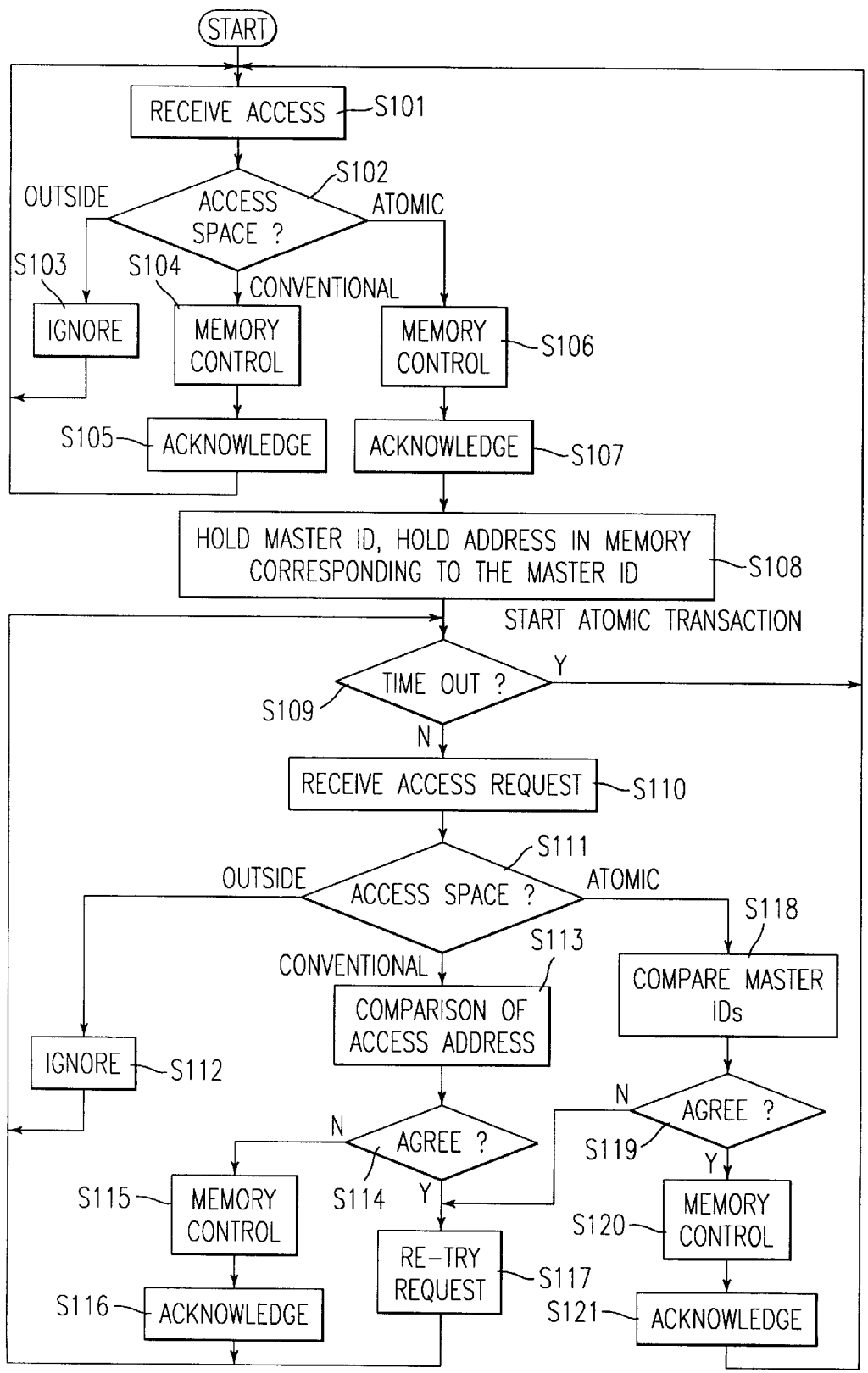
FIG. 8 is a flow chart of a process flow of the memory usage according to the second embodiment of the present invention.

A second embodiment of the present invention is described with respect to FIGS. 7 and 8. Many of the features of this second embodiment are common with the first embodiment, and thus, will not be further explained. A memory unit 100 for the multiprocessor system of FIG. 7 includes an acknowledging signal controller 118 having a timer 130 connected thereto. The timer 130 measures a time duration between an atomic transaction start signal and an atomic transaction quit signal, as provided by an acknowledging signal controller 118. When the time duration measured by the timer 130 exceeds a predetermined value, the acknowledging signal controller 118 forcefully terminates the atomic transaction.

In this second embodiment, a register 122 stores an access address, where the access address is also transmitted to a decoder 121 from the system bus 15 via the system bus interface unit 16. A comparator 123 receives an output from the register 122 and compares the register output with a current access address provided from the interface 16. An output of the comparator 123 is applied to an input of an AND gate D 127. The comparator 123 compares the original address with a present access address and outputs a logic "1" when a match occurs. In the present illustrative embodiment, active high digital logic is presumed. However, the functions described herein may also be employed with NAND gates, active low circuits, or software-based circuits that are configured to perform the same functions.

The AND gate D 127 performs a logical AND operation on the signal from the comparator 123 with the write control signal and the conventional address provided from the decoder 121, outputs the logical access request signal 1 to the acknowledging signal controller 118, indicating a retry message is sent to the requesting device when all three inputs to the AND gate 127 are a logic "1". On the other hand, if the output of the AND gate 127 is a logic "0", the acknowledging signal controller 118 allows a read access and the acknowledging signal controller 118 sends an acknowledge signal to the requesting device. Using this circuit structure, the master ID table 24 (FIG. 4) of the first embodiment is not required in the second embodiment.

Now referring to FIG. 8, a flowchart of the second embodiment summarizes the above-described steps of the one preferred process of substantially eliminating a time loss in the tightly coupled multiprocessor system through a split model bus.

In the second embodiment, steps S101 to S107 correspond with steps S1 to S7 of FIG. 6, and thus an explanation of these common steps is omitted. In step S108, after an access address space requested by a bus master is identified as being in the virtual address space, the access address register 122 stores an address of a conventional address space corresponding to the address of the atomic address space and the register 128 holds the ID of the bus master making the request. The access address register 122 temporarily stores the address therein, because the address is interpreted as an access address in the conventional address space until it is input to the decoder 121, even though the requesting device may have made an atomic address space request. At the conclusion of step S108 the process enters an atomic transaction operational mode.

Next, the process proceeds to step S109 where the timer 130 inquires whether an elapsed time expires from when the atomic transaction mode is initiated. If so, the process proceeds to step S101, forcefully terminating the atomic transaction. This approach prevents an inappropriate memory call from hanging-up the multiprocessor system for an inordinate amount of time. If the response to the inquiry in step S109 is negative, the process proceeds to step S110 where an access request is received. An explanation of subsequent steps S111 and S112 and steps S118 to S121 is presently omitted because they are similar to corresponding steps described with respect to the first embodiment.

If the response to the inquiry in step S111 indicates an access request to the conventional address space, the process proceeds to step S113 where the comparator 123 compares the above described access address with the address temporarily stored in the access address register 122. Then, in step S114 an inquiry is made to determine if the addresses agree. Here, in the case that the both access address are the same, the memory access request for the conventional address space transferred during the atomic transaction mode is actually the access for the presently used atomic address space. Therefore, the process proceeds to step S117 where the memory controller 120 carries out a re-try request when the both access addresses agree. However, if the response to the inquiry in step S114 is negative, the process proceeds to step S115 where the memory controller 120 also carries out a memory control operation and an acknowledge signal is produced in step S116. Subsequently the process returns to step S109.

According to the presently described process, an efficient operation is obtained because a memory access request other than a memory access request of a conventional address corresponding to an access address of an atomic transaction start access request is permitted. Thus, a portion of the memory is usable, even though an atomic transaction is being carried out.

Figure 9:
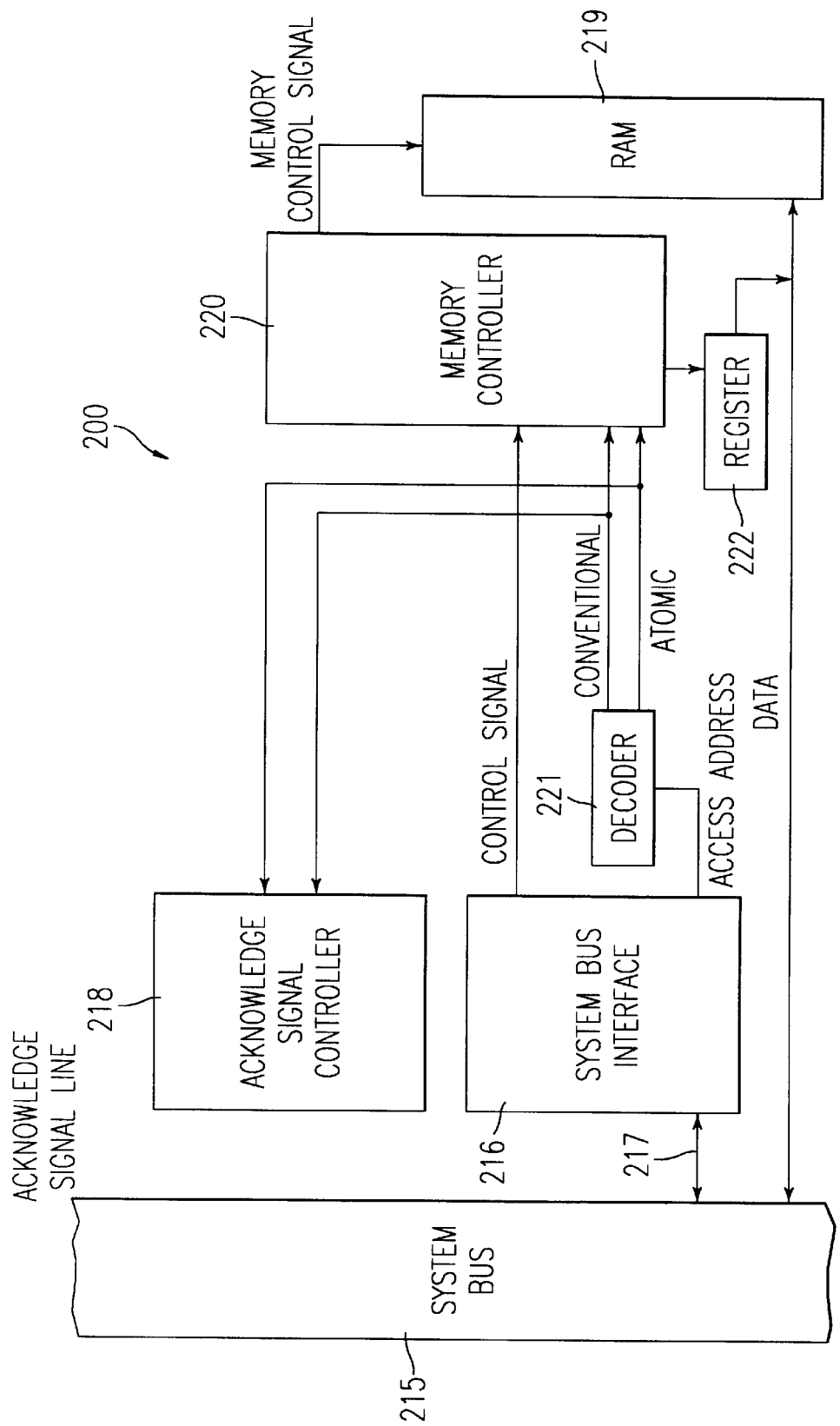
FIG. 9 is a block diagram of a multiprocessor system according to the third embodiment of the present invention.

A third embodiment of the present invention is described with respect to FIG. 9. The third embodiment differs from the structure of the first embodiment in that a numerical value other than a numerical value corresponding to false memory access lock indicator, called a false indicator, is written to the register 222. The present invention presumes that processors include the requisite software mechanisms to administrate the use of lock variables. In the structure of FIG. 9, the register 222 is connected between the memory controller 220 and a data line that interconnects the RAM 219 to the system bus interface unit 216. Also, in the third embodiment, when the memory controller 220 carries out a read access operation for the atomic address space, the memory controller 220 carries out a read access operation for an address of the conventional address space corresponding to an access address. Subsequently, the memory controller 220 writes a number other than a numerical value corresponding to False access indicator temporally stored in the register 222 on the same address in the RAM 219. In this embodiment, accessing the atomic address space initiates the atomic transaction, as was the case with the first two embodiments, but the processors themselves are intrusted with the job of checking the register 222 to determine if the processor has read/write privileges. Moreover, a processor that initiates an atomic transaction performs a read access operation and subsequently performs a read-modify-write access operation. The read-modify-write operation is an operation where a processor reads the number in the register 222 and determines that the processor is authorized to perform the atomic transaction and therefore may modify the number in the register 222 by writing a new number indicating that the processor intends to lock-out other processors from accessing shared memory until the processor re-writes the flag.

Figure 10:
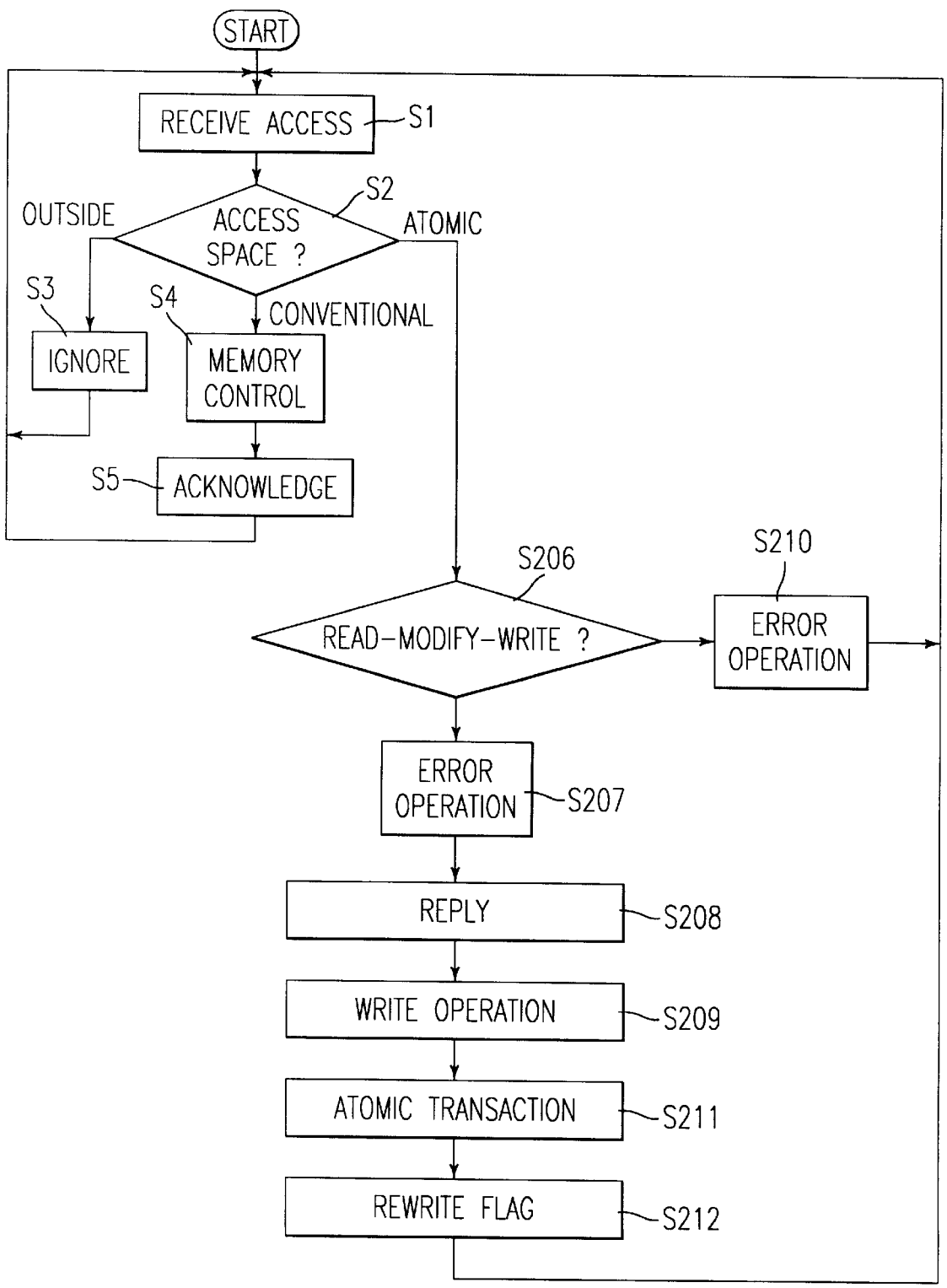
FIG. 10 is a flow chart of a process flow of a memory usage according to the third embodiment.

The operation of the circuit structure of FIG. 9 will be clarified with reference to the flowchart of FIG. 10. The present embodiment has a write-and-set operational feature for coordinating access to the RAM 219. Steps S1–S5 are similar to the corresponding steps of the first embodiment. When determined in step S2 that an address space of a requested memory access is in the atomic address space, the process flows to step S206 where an inquiry is made regarding whether the access request is a read-modify-write access (i.e., an access in which the processor is authorized to rewrite the memory lock flag). If so, the process proceeds to step S207 where the memory controller 220 carries out a memory control of a normal read operation for a conventional; address space corresponding to the access address. Then, in step S208, the acknowledging signal controller 218 (which serves as a data replying unit) returns a reply to a bus master that requested access via a system bus 215. Furthermore, in step S209, the memory controller 220 writes a specific number, for example "−1", which the present inventor recognized is rarely used as a memory lock flag and therefore is distinct and easily identified, to the same address in the RAM 219. Other processors are then responsible for checking the address to determine their respective memory access status. The process subsequently proceeds to steps S211 and S212 where the atomic transaction is performed and at the competition thereof, the memory location in RAM 219 is updated with a "0" value indicating that the memory is available for use by other processors.

On the other hand, when the memory access request is identified with a writing access for the atomic address space in the step S206, but the processor making the request is "locked-up", an error operation is implemented in step S210, and the process returns to step S1. As shown above, a write-and-set operation to the RAM 219 is implemented by easy processing according to the third embodiment.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The present document incorporates by reference the entire contents of Japanese priority document, JP 8-336638, filed in Japan on Dec. 17, 1996.

What is claimed as new and desired to be secured by Letters Patent of the United States is:

1. A memory unit in a tightly coupled multiprocessor system having a split model bus, comprising:

a decoder that receives an access request and interprets whether the access request is directed to an atomic address space or a conventional address space;

an identifier unit coupled to said decoder and configured to identify whether the memory access request originates from a bus master;

an atomic transaction mode shifting unit that shifts a state of operation from a normal mode of operation to an atomic transaction mode of operation when the memory access request is for the atomic address space, said atomic transaction mode of operation restricting memory access to devices other than the bus master during the atomic transaction;

a register configured to hold an identifier associated with the bus master that initiates the atomic transaction mode of operation; and a memory access prohibit unit that produces a re-try signal in response to receiving a memory access request from another device whose identifier does not match the identifier held in the register.

2. The memory unit according to claim 1, further comprising:
a normal mode shifting unit that shifts the state of operation from the atomic transaction mode of operation to the normal mode when an identifier of a device making a new access request matches the identifier held in the register, the memory access request being recognized as an atomic transaction quit request.

3. The memory unit according to claim 1, wherein said memory access prohibit unit comprises a discrimination mechanism that determines whether the bus master is a processor, and when the bus master is not a processor, permits a memory read request, but not a memory write request for other devices.

4. The memory unit according to claim 1, wherein said memory access prohibit unit is configured to prohibit a memory access when a memory access request is directed to the atomic address space, while in the atomic transaction mode of operation.

5. The memory unit according to claim 1, wherein:
said register is configured to hold an address associated with an access address of an atomic transaction start request; and
said memory access prohibit unit being configured to prohibit a memory access when the memory access request is directed to the access address of the atomic transaction start request.

6. A memory unit according to claim 1, further comprising:
a timer, said timer being configured to keep track of an elapsed time between an occurrence of an atomic transaction start request relative to an atomic transaction quit request; and
an atomic transaction termination unit coupled to said timer, said atomic transaction termination unit configured to change said atomic transaction mode of operation to another mode of operation after the elapsed time expires.

7. The memory unit of claim 1, wherein said memory access prohibit unit uses at least one of a semaphore variable and a lock variable to inhibit memory access during the atomic transaction mode of operation.

8. The memory unit of claim 1, wherein said split model bus is available for use by other processors and devices when said atomic transaction mode shifting unit shifts said state of operation to said atomic transaction mode.

9. A memory unit of a tightly coupled multiprocessor system, employing a split model bus, comprising:
a decoder that receives an access request and interprets whether the access request is directed to an atomic address space or a conventional address space;
an atomic transaction identifier unit coupled to said decoder and configured to identify an access space requested by a memory access request, and configured to discriminate between a memory read access request directed to the atomic address space and a read-modify-write access request; and
a data replying unit configured to,
return reading data to a bus master where the reading data is read from the conventional address space in response to the memory read access request, and
return the reading data identified by a read-modify-write access request and write a number corresponding to a memory access lock indicator in the conventional address space.

10. The memory of claim 9, further comprising a memory access prohibit unit that uses at least one of a semaphore variable and a lock variable so as to inhibit access to the real address space.

11. A memory unit in a tightly coupled multiprocessor system having a split model bus, comprising:
means for decoding an access request and interpreting whether the access request is directed to an atomic address space or a conventional address space;
means for identifying whether the memory access request originates from a bus master;
means for shifting a state of operation from a normal mode of operation to an atomic transaction mode of operation when the memory access request is for the atomic address space, said atomic transaction mode of operation restricting memory access to devices other than the bus master during the atomic transaction;
means for holding an identifier associated with the bus master that initiates the atomic transaction mode of operation; and
means for producing a re-try signal in response to receiving a memory access request from another device whose identifier does not match the identifier held in the means for holding.

12. The memory unit of claim 11, further comprising:
means for shifting the state of operation from the atomic transaction mode of operation to the normal mode when an identifier of a device making a new access request matches the identifier held in the means for holding, the memory access request being recognized as an atomic transaction quit request.

13. The memory unit of claim 11, wherein said means for producing comprises means for discriminating whether the bus master is a processor, and when the bus master is not a processor, permitting an execution of a memory read request, but not a memory write request.

14. The memory unit according to claim 11, wherein said means for producing comprises means for prohibiting a memory access when a memory access request is directed to the atomic address space while in the atomic transaction mode of operation.

15. The memory unit according to claim 11, wherein:
said means for holding comprises means for holding an address associated with the conventional address space corresponding with an access address of an atomic transaction start request; and
said means for producing comprises means for prohibiting a memory access when the memory access request is directed to the access address of the atomic transaction start request.

16. The memory unit according to claim 11, further comprising:
means for keeping track of an elapsed time between an occurrence of an atomic transaction start request relative to an atomic transaction quit request; and
means for changing said atomic transaction mode of operation to another mode of operation after the elapsed time expires.

17. The memory unit of claim 11, further comprising means for allowing processors and other devices, in addition to said bus master, to use said split model bus during an atomic transaction.

18. A memory unit of a tightly coupled multiprocessor system employing a split model bus, comprising:
means for decoding an access request and interpreting whether the access request is directed to an atomic address space or a conventional address space;
means for identifying an access space requested by a memory access request, comprising means for discriminating between a memory read access request directed to the atomic address space and a read-modify-write access request;

means for returning reading data to a bus master where the reading data is read from the address space identified by the memory read access request; and means for returning the reading data identified by the read-modify-write access request and for writing a number corresponding to a memory access lock indicator in the real address space.

19. A method for accessing a memory unit in a tightly coupled multiprocessor system having a split model bus, comprising the steps of:

decoding an access request and interpreting whether the access request is directed to an atomic address space or a conventional address space;

identifying whether the memory access request originates from a bus master when said decoding step interprets that said access request is directed to the atomic virtual address space;

shifting a state of operation from a normal access to an atomic transaction access when the memory access request is for the atomic address space, said atomic transaction access restricting memory access to devices other than the bus master during the atomic transaction;

holding an identifier associated with the bus master that initiates the atomic transaction access; and producing a re-try signal in response to receiving a memory access request from another device whose identifier does not match the identifier held in the holding step.

20. The method of claim 19, further comprising the step of:

shifting the state of operation from the atomic transaction access to the normal access when an identifier of a device making a new access request matches the identifier held in the holding step, the memory access request being recognized as an atomic transaction quit request.

21. The method of claim 19, wherein said producing step comprises discriminating whether the bus master is a processor, and when the bus master is not a processor, permitting an execution of a memory read request, but not a memory write request.

22. The method of claim 19, wherein said step of producing comprising prohibiting a memory access when a memory access request is directed to the atomic address space, while performing the atomic transaction access.

23. The method of claim 19, wherein:

said holding step comprises holding an address associated with the conventional address space corresponding with an access address of an atomic transaction start request; and said producing step comprises prohibiting a memory access when the memory access request is directed to the access address of the atomic transaction start request.

24. The method of claim 19, further comprising the steps of:

keeping track of an elapsed time between an occurrence of an atomic transaction start request relative to an atomic transaction quit request; and changing said atomic transaction access to another access after the elapsed time expires.

25. The method of claim 19, further comprising the step of allowing processors and other devices, in addition to said bus master, to use said split model bus during an atomic transaction.

26. A method for accessing a memory unit in a tightly coupled multiprocessor system having a split model bus configured to perform an atomic transaction therein, comprising the steps of:

decoding an access request and interpreting whether the access request is directed to an atomic address space or a conventional address space;

identifying an access space requested by a memory access request, comprising discriminating between a memory read access request directed to the atomic address space and a read-modify-write access request;

returning reading data to a bus master where the reading data is read from the address space identified by the memory read access request; and returning the reading data identified by the read-modify-write access request and for writing a number corresponding to a memory access lock indicator in the conventional address space.

* * * * *